United States Patent
Hsu et al.

(10) Patent No.: US 10,364,352 B2
(45) Date of Patent: *Jul. 30, 2019

(54) HIGH TEMPERATURE MELT PROCESSABLE SEMI-CRYSTALLINE POLY(ARYL ETHER KETONE) CONTAINING A (4-HYDROXYPHENYL)PHTHALAZIN-1(2H)-ONE COMONOMER UNIT

(75) Inventors: Tim Hsu, State College, PA (US);
Yi-Feng Wang, Clifton Park, NY (US);
Allan S. Hay, Montreal (CA)

(73) Assignee: Polymics, LTD, State College, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,400

(22) Filed: Apr. 30, 2011

(65) Prior Publication Data
US 2011/0206880 A1    Aug. 25, 2011

Related U.S. Application Data (63) Continuation-in-part of application No. PCT/US2009/005902, filed on Oct. 30, 2009.
(Continued)

(51) Int. Cl.
*C08G 16/00* (2006.01)
*C08L 79/04* (2006.01)
(Continued)

(52) U.S. Cl.
CPC .......... *C08L 79/04* (2013.01); *C08G 65/4037* (2013.01); *C08G 73/0694* (2013.01);
(Continued)

(58) Field of Classification Search
CPC ............ C08J 5/04–10; C08G 2650/40; C08G 65/4012
See application file for complete search history.

(56) References Cited

U.S. PATENT DOCUMENTS 4,320,220 A    3/1982    Pampouchidis
4,717,761 A    1/1988    Staniland
(Continued)

FOREIGN PATENT DOCUMENTS

JP    2006188652 A    *    7/2006

OTHER PUBLICATIONS

Meng et al (Synthesis of Novel Poly(phthalazinone ether sulfone ketone)s and Improvement of Their Melt Flow Properties, Journal of Applied Polymer Science, vol. 66, 1425-1432, 1997).*
(Continued)

*Primary Examiner* — Rachel Kahn
(74) *Attorney, Agent, or Firm* — GFD Patents LLC; Gerald F. Dudding (57) ABSTRACT

Compositions and methods for a melt processable semicrystalline poly(aryl ether ketone) incorporating phthalazinone and 4,4'-biphenol as comonomer units are described herein. The polymers are resistant to and insoluble in common organic solvents and liquids as well as in aggressive organic solvents such as chloroform and chlorinated liquids. The polymers are melt processable via techniques such as extrusion, injection molding, and compression molding. The semicrystalline poly(aryl ether ketone) containing phthalazinone comonomer units have properties which make them suitable for manufacturing high temperature resistant molded systems and other articles.

7 Claims, 2 Drawing Sheets

16: amorphous polymer
18: semicrystalline polymer
20: crystalline polymer

Related U.S. Application Data (60) Provisional application No. 61/197,981, filed on Oct. 31, 2008.

(51) Int. Cl.
    *C08G 65/40*    (2006.01)
    *C08G 73/06*    (2006.01)
    *C08J 5/04*     (2006.01)
    *C08J 5/10*     (2006.01)
    *C08K 3/013*    (2018.01)

(52) U.S. Cl.
    CPC . *C08J 5/04* (2013.01); *C08J 5/10* (2013.01); *C08K 3/013* (2018.01); *C08G 2650/40* (2013.01); *C08J 2371/12* (2013.01); *C08J 2379/04* (2013.01); *Y10T 428/139* (2015.01)

(56) References Cited

U.S. PATENT DOCUMENTS

| | | | |
|---|---|---|---|
| 4,868,273 A | | 9/1989 | Daniels |
| 5,059,057 A | * | 10/1991 | Graef .................. 403/298 |
| 5,070,153 A | * | 12/1991 | Alvarez et al. ............ 525/420 |
| 5,130,342 A | | 7/1992 | McAllister et al. |
| 5,254,663 A | | 10/1993 | Hay |
| 5,391,605 A | * | 2/1995 | Andres et al. ............. 524/404 |
| 5,654,393 A | | 8/1997 | Kemmish et al. |
| 5,824,402 A | | 10/1998 | Kemmish et al. |
| 2007/0238853 A1 | | 10/2007 | Hay et al. |

OTHER PUBLICATIONS

Meng et al (Facile Synthesis and Properties of Semicrystalline Copoly(Arylene Ether Ketone) Containing Hydroquinone and Phthalazinone, Journal of Applied Polymer Science, vol. 81, 2687-2695 (2001)) (Year: 2001).*

Sandler et al (Carbon-nanofibre-reinforced poly(ether ether ketone) composites, Composites Part A: Applied Science and Manufacturing, vol. 33, Issue 8, Aug. 1, 2002, pp. 1033-1039). (Year: 2002).*

ISA/210—PCT International Search Report for International Patent Application No. PCT/US2009/05902, dated Dec. 29, 2009.

Xia,Jiqiang, et al., "Copolymerization and Blending of Poly(phthalazinone ether ketone)s to Improve their Melt Processability," Journal of Applied Polymer Science, vol. 103, 2575-2580, 2007.

Meng, Y., et al, Journal of Polymer Science, Part A: Polymer Chemistry, vol. 37, 1781-1788, 1999. Synthesis and Thermal Properties of Poly(arylene ether ketone)s containing Phthalazinone Moieties.

Sun, Qingmin, et al, Journal of Applied Polymer Science, vol. 104, 1744-1753, 2007. Synthesis and Properties of Organic Soluble Semicrystalline Poly(aryl ether ketone)s Copolymers Containing Phthalazinone Moieties.

* cited by examiner

16: amorphous polymer
18: semicrystalline polymer
20: crystalline polymer

*Fig.1*

14: brittle oliogmers
12: melt processable polymer with good ductility and mechanical properties
10: ultra-high molecular weight polymer not melt processable

*Fig.2*

HIGH TEMPERATURE MELT PROCESSABLE SEMI-CRYSTALLINE POLY(ARYL ETHER KETONE) CONTAINING A (4-HYDROXYPHENYL)PHTHALAZIN-1(2H)-ONE COMONOMER UNIT

RELATED APPLICATIONS

This is a continuation-in-part of International Application PCT/US2009/005902, with an international filing date of Oct. 30, 2009, which claims priority to U.S. provisional application Ser. No. 61/197,981, filed Oct. 31, 2008.

INTRODUCTION

The present teachings are directed to semicrystalline poly(aryl ether ketone) polymers in which are incorporated a (4-hydroxyphenyl)phthalazin-1(2h)-one (phthalazinone) comonomer unit, which polymers exhibit ultra high temperature properties suitable for manufacturing high temperature resistant molded systems and other articles of manufacture.

Poly(aryl ether ketone)s with high heat resistance and chemical resistance are highly desirable for the manufacture of molded articles for demanding automotive, aerospace, electronics and oil field applications. Poly(aryl ether ketone)s are important engineering resins because of their generally excellent properties, such as good mechanical properties at elevated temperatures, exceptional chemical resistance against organic solvents, and strong acids and bases, fire resistance and electrical insulating.

In fact, certain poly(aryl ether)s such as poly(aryl ether sulfone)s and poly(aryl ether ketone)s are high temperature engineering thermoplastic resins that have been extensively used for a wide range of commercial applications when resistance to high temperatures is required. However, all currently known polymers of this type have significant commercial disadvantages. For instance, commercially available poly(aryl ether sulfone)s typically have glass transition temperatures (Tg) from 180° C. to 220° C., but they are amorphous and thus have poor resistance to organic solvents and liquids. Thus, they are not suitable for use in many industrial or commercial applications. Similarly, commercially available poly(aryl ether ketone)s are crystalline and have excellent resistance to organic solvents and liquids. However, their Tg is low, typically in the range of 143° C. to 170° C. This limits their use commercially and industrially.

The present teachings disclose a family of melt processable semicrystalline polymers that have a Tg of about 185° C. to 240° C. and maintain good chemical resistance to organic solvents and liquids.

In order to describe the novelty and usefulness of the present inventors' new family of polymers, a brief summary of known synthetic methods is necessary. One route to the synthesis of poly(aryl ether ketones) polymers is by the reaction of salts of dihydroxyaromatic compounds, such as hydroquinone, with activated dihaloaromatic molecules. One commercially available group of poly(ether ether ketone), available from Victrex® PEEK Polymers, is conventionally made by the nucleophilic polycondensation of hydroquinone with 4,4'-difluorobenzophenone in the presence of anhydrous potassium carbonate and is prepared at elevated temperatures (320° C.) in diphenyl sulphone as such solvent as described, for example, in U.S. Pat. No. 4,320,220. This polymer has a melting temperature (Tm) of 334° C. and a glass transition temperature (Tg) of about 143° C.

Subsequently in U.S. Pat. No. 4,717,761, the corresponding poly(biphenol ether ketone) from 4,4'-biphenol was synthesized. This polymer has a melting point of 416° C. and a Tg of 167° C., and is not melt processable.

Copoly(ether ether ketone)s of hydroquinone (I) and 4,4'-biphenol (II) were also synthesized with a Tm and a Tg between those of the two homopolymers as illustrated in Table I.

TABLE I

| Example or Comp. | Molar Proportions | | Tg | Tm | MV (c) |
|---|---|---|---|---|---|
| Example | I (%) | II (%) | (a) (° C.) | (b) (° C.) | (kN · s · m⁻²) |
| A | 100 | 0 | 143 | 334 | 0.49 |
| 4 | 95 | 5 | 146 | 328 | 0.40 |
| 2 | 90 | 10 | 146 | 322 | 0.65 |
| 3 | 85 | 15 | 148 | 315 | 0.45 |
| 1 | 80 | 20 | 149 | 309 | 0.43 |
| 5 | 65 | 35 | 156 | 313 | 0.26* |
| B | 50 | 50 | 160 | 341 | 1.2** |
| C | 0 | 100 | 167 | 416 | 0.58** |

*The intrinsic viscosity (IV) of the polymer was measured at 25° C. on a solution of the polymer in concentrated sulphuric acid of density 1:84 g cm⁻³, said solution containing 0.1 g of polymer per 100 cm³ of solution. An IV of 0.92 is equivalent to an MV of about 0.26.
**The reduced viscosity (RV) of the polymer was measured at 25° C. on a solution of the polymer in concentrated sulphuric acid of density 1.84 b cm⁻³, said solution containing 1 g of polymer per 100 cm³ of solution, the measurement being taken immediately after dissolution of the polymer is complete. An RV of 1.78 is equivalent to an MV of about 1.2. An RV of 1.28 is equivalent to an MV of about 0.58.
(a) is the glass transition temperature
(b) is the crystalline melting temperature
(c) MV is the melt viscosity
(U.S. Pat. No. 4,717,761)

It was demonstrated in U.S. Pat. No. 4,868,273 to Daniels that poly(aryl ether ketone)s are generally highly crystalline with Tm of at least 300° C. but with Tg typically below 180° C. and often in the range of 140° C. to 160° C. Daniels states that these polymers are therefore not suitable for applications that require mechanical properties at elevated temperatures since an appreciable portion of their mechanical properties are lost at temperatures around the Tg. These polymers are not suitable for applications that require the retention of mechanical properties such as modulus at temperatures of 180° C. or higher.

Daniels teaches preparing poly(aryl ether) block copolymers by polymerization of 4-(4-chlorobenzoyl)-4'-hydroxybiphenyl in the presence of the poly(ether sulfone) synthesized from 4,4'-(-(4-chlorophenylsulphonyl)biphenyl and 4,4'-dihydroxydiphenylsulphone. The resulting block copolymer has a Tg of 213° C. and a Tm of 388° C. This high Tg block copolymer is prepared in two steps: synthesis of high Tg amorphous poly(aryl ether sulfone) block followed by copolymerization with a ketone monomer to form a crystalline poly(aryl ether ketone) block. This block copolymer is therefore not truly a high Tg poly(aryl ether ketone). Instead it is a hybrid of poly(aryl ether sulfone) and poly(aryl ether ketone). Due to the presence of poly(aryl ether sulfone) in this block copolymer, its chemical resistance is poor. For example, when a film of this block copolymer was immersed in chlorinated solvent dichloromethane for 24 hours at room temperature, the solvent uptake (absorption) by the film was as high as 33% wt. In addition, this block copolymer has a very high melting temperature (388° C.) that is closer to the degradation temperature, and thus would be difficult to be melt processed.

To overcome similar problems, U.S. Pat. Nos. 5,654,393 and 5,824,402 to Kemish, et al. teach preparing poly(aryl ether) copolymers by polymerization of 4,4'-difluorobenzophenone and 4,4'-bis(4-chlorophenylsulphonyl)biphenyl (LCDC), and 4,4'-dichlorodiphenylsulfone (DCDPS) with 4,4'-dihydroxybenzophenone. The resulting copolymer has a Tg of 164-173° C. and a Tm of 356-358° C. as illustrated in Table II.

TABLE II

| Molar Percent | | Value of n in | | | Tr. |
|---|---|---|---|---|---|
| LCDC | DCDPS | (Ph SO$_2$ Ph)$_n$ | RV | T$_g$ | (reheat) |
| 90 | 10 | 1.9 | 0.95 | 172.6 | 356 |
| 80 | 20 | 1.8 | 0.93 | 171.2 | 358 |
| 50 | 50 | 1.5 | 1.07 | 166.5 | 357.7 |
| 20 | 80 | 1.2 | 0.89 | 164.2 | 356.8 |

(U.S. Pat. No. 5,654,393)

To improve the thermal resistance of poly(aryl ether ketone), U.S. Pat. No. 5,254,663 to Hay teaches preparing the poly(aryl ether ketone) from 4,4'-difluorobenzophenone and 4-(4-hydroxyphenyl)phthalazin-1(2H)-one (phthalazinone) in a polar solvent in the presence of potassium carbonate. The resulting polymer is an amorphous polymer with a Tg of 254° C.

Hay, et al. (*Journal of Polymer Science: Part A: Polymer Chemistry*, Vol. 37, 1781-1788, 1999) also teach preparing poly(aryl ether ketone) copolymer from 4,4'-difluorobenzophenone, hydroquinone and 4-(4-hydroxyphenyl) phthalazin-1(2H)-one (phthalazinone).

With the incorporation of 4-(4-hydroxyphenyl)phthalazin-1(2H)-one, the resulting poly(aryl ether ketone) copolymer has a higher glass transition temperature than poly(ether ether ketone) (PEEK). However, the crystallinity of the copolymer is dramatically reduced. Consequently, the chemical resistance of this higher Tg copolymer is significantly reduced. For example, when the molar ratio of phthalazinone monomer and hydroquinone is 35/65, the resulting copolymer is completely soluble in chloroform. (The inherent viscosities and molecular weights in Table III were measured using chloroform as a solvent.) This copolymer has a Tg of 194° C. and a melting point of 252° C., with a weak melting endotherm of 0.5 J/g after melt as shown in Table IV. This indicates that this copolymer has very poor chemical resistance against organic solvents after melt processing. Even when the molar ratio of phthalazinone monomer and hydroquinone is reduced to 20/80, the resulting copolymer has a low melting point of 288° C. with a very weak melting endotherm of 0.1 J/g after melt (Table IV). To maintain sufficient crystallinity, only 10 mol % phthalazinone can be incorporated. The resulting copoly(aryl ether ketone) has a Tg of 161° C. and a Tm of 315° C. with a strong melting endotherm of 21.8 J/g after melt (Table IV). The result is that although the Tg is 18° C. higher than PEEK, the melting temperature is 28° C. lower than PEEK such that it does not improve thermal performance significantly.

TABLE III

Molecular Weights of PAEKs

| PAEK | $\eta_{inh}$ (dL/g) | $\overline{M}_n$ | $\overline{M}_x$ | MDI[a] | Yield (%) |
|---|---|---|---|---|---|
| PAEK(10/90) | 0.84[b] | c | c | | 99.5 |
| PAEK(20/80) | 0.83[b] | c | c | | 93.0 |
| PAEK(35/65) | 0.65 | 28,389 | 89,365 | 3.15 | 88.1 |
| PAEK(50/50) | 0.60 | 24,967 | 100,336 | 4.02 | 86.0 |
| PAEK(65/35) | 0.63 | 26,003 | 118,280 | 4.36 | 80.0 |
| PAEK(80/20) | 0.36 | 9,218 | 19,753 | 2.14 | 81.2 |
| PAEK(1000/0) | 0.39 | 11,809 | 26,371 | 2.23 | 80.0 |

$M_n$ and $M_w$ were determined by GPC using chloroform as solvent.
[a] Molecular weight distribution index
[b] 0.5 g/dL in 98% sulfuric acid
[c] Insoluble in CHCl₃
(*Journal of Polymer Science: Part A: Polymer Chemistry*, Vol. 37, 1781-1788, 1999)

TABLE IV

Thermal Properties for PAEKs

| PAEK | 1st Scan | | | 2nd Scan | | | | TGA | |
|---|---|---|---|---|---|---|---|---|---|
| | $T_g$(° C.) | $T_m$(° C.) | ΔH(J/g) | $T_g$(° C.) | $T_c$(° C.) | $T_m$(° C.) | ΔH(J/g) | $T_{ca}$(° C.) | $T_{max}$(° C.)[a] |
| PAEK (10/90) | | 322.1 | 49.2 | 161.8 | 234.0 | 315.2 | 21.8 | 554.5 | 560.3 |
| PAEK (20/80) | 178.8 | 288.8 | 16.9 | 171.9 | | 288.8 | 0.1 | 508.2 | 516.3 |
| PAEK (35/65) | 206.4 | 258.8 | 5.7 | 194.2 | | 253.8 | 0.5 | 501.0 | 551.8 |
| PAEK (50/50) | 208.8 | 253.9 | 0.5 | 210.0 | | 252.8 | 0.5 | 500.9 | 520.8 |
| PAEK (65/35) | 220.5 | 252.4 | 0.2 | 222.3 | | 252.1 | 0.1 | 495.4 | 516.9 |
| PAEK (80/20) | 230.5 | 252.4 | 0.1 | 233.9 | | 251.2 | 0.1 | 499.9 | 516.0 |
| PAEK (100/0) | 264.0 | | | 264.0 | | | | 482.8 | 508.0 |

[a] $T_{max}$ is the maximum loss temperature of PAEKs determined by TGA.

Finally, Jian, et al. (*Journal of Applied Polymer Science*, Vol. 104, 1744-1753, 2007) teach preparing poly(ether ether ketone ketone) (PEEKK) by polymerization of 1,4-bis(4-fluorobenzoyl)benzene with hydroquinone (HQ) and 4-(4-hydroxyphenyl)phthalazin-1(2H)-one (DHPZ) (Table V) with Tg of 171 to 232° C. and Tm of 292 to 355° C. as shown in Table VI.

TABLE V

TABLE V-continued

The Compositions and Physical Properties of PAEK Copolymers

| Copolymers | Copolymer Composition DHPZ/HQ | Yield (%) | Color | $M_n^a$ | $MDI^b$ | Weight Loss$^c$(%) |
|---|---|---|---|---|---|---|
| PAEK19 | 10/90 | 90 | Yellow | 6,700$^d$ | —$^e$ | 0.82 |
| PAEK28 | 20/80 | 90 | Yellow | 7,500$^d$ | — | 0.71 |
| PAEK37 | 30/70 | 90 | Yellow | 8,200$^d$ | — | 0.55 |
| PAEK46 | 40/60 | 90 | White | 9,800$^d$ | — | 1.38 |
| PAEK55 | 50/50 | 90 | White | 11,000$^d$ | — | 1.42 |
| PAEK64 | 60/40 | 93 | White | 56,000 | 2.01 | 1.01$^f$ |
| PAEK73 | 70/30 | 93 | White | 71,000 | 2.63 | 0.76$^f$ |
| PAEK82 | 80/20 | 93 | White | 29,000 | 3.95 | 0.67$^f$ |
| PAEK91 | 90/10 | 93 | White | 27,000 | 2.45 | 0.31$^f$ |

$^a$Detected in chloroform by GPC.
$^b$Molecular weight distribution index.
$^c$Determined by measuring the residual polymers extracted with chloroform.
$^d$Measured in concentrated sulfuric acid by $^{19}$FNMR.
$^e$Not tested.
$^f$Determined by measuring the polymers precipitated from chloroform.
(Journal of Applied Polymer Science, Vol. 104, 1744-1753, 2007.)

TABLE VI $T_g$ and $T_m$ Values of PAEK Copolymers

| Copolymers | $T_g$(° C.)$^a$ | $T_g$(° C.)$^b$ | $T_g$(° C.)$^c$ | $T_m$(° C.)$^a$ | $\Delta H(Jg^{-1})^a$ | $T_m$(° C.)$^b$ | $\Delta H(Jg^{-1})^b$ |
|---|---|---|---|---|---|---|---|
| PEEKK | 162 | 162 | 162($T_{g1}$) | 362 | 46.7 | 362 | 46.7 |
| PAEK19 | 171 | 168 | 169 | 355 | 38.2 | 352 | 37.0 |
| PAEK28 | 182 | 179 | 177 | 347 | 30.1 | 344 | 28.8 |
| PAEK37 | 192 | 188 | 185 | 338 | 26.4 | 336 | 24.5 |
| PAEK46 | 199 | 195 | 193 | 327 | 22.3 | 323 | 20.0 |
| PAEK55 | 202 | 200 | 201 | 313 | 12.9 | 309 | 10.7 |
| PAEK64 | 207 | 208 | 209 | 297 | 8.5 | 293 | 5.9 |
| PAEK73 | 216 | 216 | 218 | 288 | 0.3 | 285 | 0.1 |
| PAEK82 | 222 | 224 | 227 | 292 | 0.1 | 290 | 0.1 |
| PAEK91 | 233 | 235 | 236 | —$^d$ | — | — | — |
| PPEKK | 245 | 245 | 246($T_{g2}$) | — | — | — | — |

$^a$Values of the first scan from DSC measurements conducted at a heating rate of 10° C. min$^{-1}$ in nitrogen.
$^b$Values of the second scan from DSC measurements conducted at a heating rate of 10° C. min$^{-1}$ in nitrogen.
$^c$Calculated from the Fox equation.
$^d$No obvious peak was detected.
(*Journal of Applied Polymer Science*, Vol. 104, 1744-1753, 2007.)

In this family of polymers, in order to maintain good chemical resistance of the resulting polymer, the phthalazinone/hydroquinone ratio has to be less than 40/60. As illustrated in Table VII, polymers with phthalazinone/hydroquinone ratios of 40/60 (e.g., PAEK46) or higher (PAEK55, PAEK64, PAEK73, PAEK82 and PAEK91) are either partially or fully soluble in organic solvents such as chloroform, dimethylformamide (DMF), and tetrahydrofuran (THF). Thus, these polymers do not have good chemical resistance to organic solvents or liquids.

Although polymers with phthalazinone/hydroquinone ratios of 30/70 or less (e.g., PAEK37, PAEK28 and PAEK19 in Table VII) are insoluble in these organic solvents, the resulting polymers are typically low molecular weight oligomers with Mn from 6700 to 11,000 (Table V). These polymers thus have poor mechanical properties and are brittle. These oligomers, such as PAEK37, have an inherent viscosity (IV) of only 0.35 g/dL or less in 98% sulfuric acid. As a consequence, the oligomers have no practical use due to their poor mechanical properties.

TABLE VII

Solubility of PAEK Copolymers

| Copolymers | Solubility$^a$ | | | | | | | | |
|---|---|---|---|---|---|---|---|---|---|
| | CHCl$_3$ | NMP | NB | TCE | DMA | DMF | THF | DMSO | Conc. H$_2$SO$_4$ |
| PEEK | − | − | − | − | − | − | − | − | + |
| PAEK19 | − | − | − | − | − | − | − | − | + |
| PAEK28 | − | − | − | − | − | − | − | − | + |
| PAEK37 | − | − | − | − | − | − | − | − | + |
| PAEK46 | ± | ± | ± | ± | − | − | − | − | + |
| PAEK55 | ± | ± | ± | ± | − | − | − | − | + |
| PAEK64 | + | + | + | + | ± | ± | ± | − | + |
| PAEK73 | + | + | + | + | ± | ± | ± | − | + |
| PAEK82 | + | + | + | + | ± | ± | ± | − | + |
| PAEK91 | + | + | + | + | ± | ± | ± | − | + |
| PPEKK | + | + | + | + | ± | ± | ± | − | + |

$^a$Tested with 50 mg of the polymers in 1 ml of the solvent: +, totally soluble at 25° C. for 12 h; ± partially soluble at 25° C. for 12 h; − insoluble at 25° C. for 12 h.
(*Journal of Applied Polymer Science*, Vol. 104, 1744-1753, 2007)

There is, therefore, a need for an ultra high temperature semicrystalline polymer (UHTSP) that is melt processable, and which exhibits, inter alia, the following defining characteristics:

A. Excellent Environmental Resistance
  i. Resistance to chlorinated solvents and strong polar solvents such as methyl ether ketone (MEK), methyl propyl ketone (MPK), strong acids and bases, etc.;
  ii. Radiation resistance; and
  iii. Hydrolysis resistance.
B. Mechanical Performance
  i. Wear resistance;
  ii. Adequate stiffness, strength and impact properties; and
  iii. Adequate ductility, with sufficient elongation to break.
C. High Thermal Transitions.
  i. High glass transition temperature (>180° C.); and
  ii. High melt temperature (>300° C.).

In addition, in order to achieve reasonable mechanical properties for commercially useful material, a UHTSP must achieve a sufficient degree of polymerization, typically measured by intrinsic viscosity (IV). A UHTSP with an IV of 0.5 is usually the threshold, but an IV of ≥0.7 is typically required to be a commercially viable polymer.

Environmental and high temperature resistance typically require a UHTSP to achieve a reasonable degree of crystallinity and crystallization rate when the polymer is further processed using commercially available methods such as extrusion, injection molding and compression molding. In most engineering applications, a reasonable degree of crystallinity in UHTSP products will enhance the thermal resistance closer to the melting transition temperature as opposed to the glass transition temperature for amorphous polymer. Semicrystalline polymers also typically manifest better chemical resistance to most aggressive solvents in harsh use conditions.

Based upon the above-described limitations, there is a need for a poly(aryl ether ketone) with a high molecular weight, good mechanical properties, and with an inherent viscosity greater than 0.5, that has a high Tg (>180° C.) semicrystalline polymer with a melting point higher than about 300° C., but less than about 380° C., in order to be melt processed below typical polymer degradation temperatures of about 400° C., and which polymer is not soluble in common organic solvents such as chloroform. Similarly, there is a need for a high molecular weight semicrystalline poly(aryl ether ketone) with a glass transition temperature (Tg) above 180° C. that can be used to manufacture articles, films, sheets and fibers via melt processing techniques such as extrusion, injection molding, and blow molding.

SUMMARY

The present teachings provide an article of manufacture comprising a melt processable semicrystalline poly(aryl ether ketone) that incorporates phthalazinone and 4,4'-biphenol as comonomer units. The semicrystalline poly(aryl ether ketone) containing phthalazinone and 4,4'-biphenol comonomer units according to the present teachings has a Tg of about 180° C. to about 240° C. with a melting point of about 310° C. to about 376° C. These polymers are insoluble and resistant to common organic solvents and liquids. The polymers of the present teachings are also insoluble in aggressive organic solvents such as chloroform and chlorinated liquids. The present polymers are melt processable via extrusion, injection molding, compression molding and the like. The semicrystalline poly(aryl ether ketone) containing phthalazinone comonomer units according to the present teachings have properties which make them suitable for manufacturing high temperature resistant molded systems and other articles of manufacture.

These and other features of the present teachings are set forth herein.

BRIEF DESCRIPTION OF THE DRAWINGS

The skilled artisan will understand that the drawings described herein are for illustration purposes only. The drawings are not intended to limit the scope of the present teachings in any way.

DESCRIPTION OF VARIOUS EMBODIMENTS

As referred to in this application, the following definitions and terms are used:

"Tg" means glass transition temperature.

"Tm" means the peak temperature at which the melting endotherm is observed.

"IV" means inherent viscosity. The inherent viscosity of each polymer was measured at 30° C. on a solution of 0.5 g of polymer in 100 cm³ of solution in 98% sulfuric acid.

"$\Delta H_m$" means the enthalpy of melting endotherm.

"B/P Ratio" means the molar ratio (Q/Cp) of 4,4'-biphenol to phthalazinone as incorporated into the polymers of the present teachings.

Figure 1:
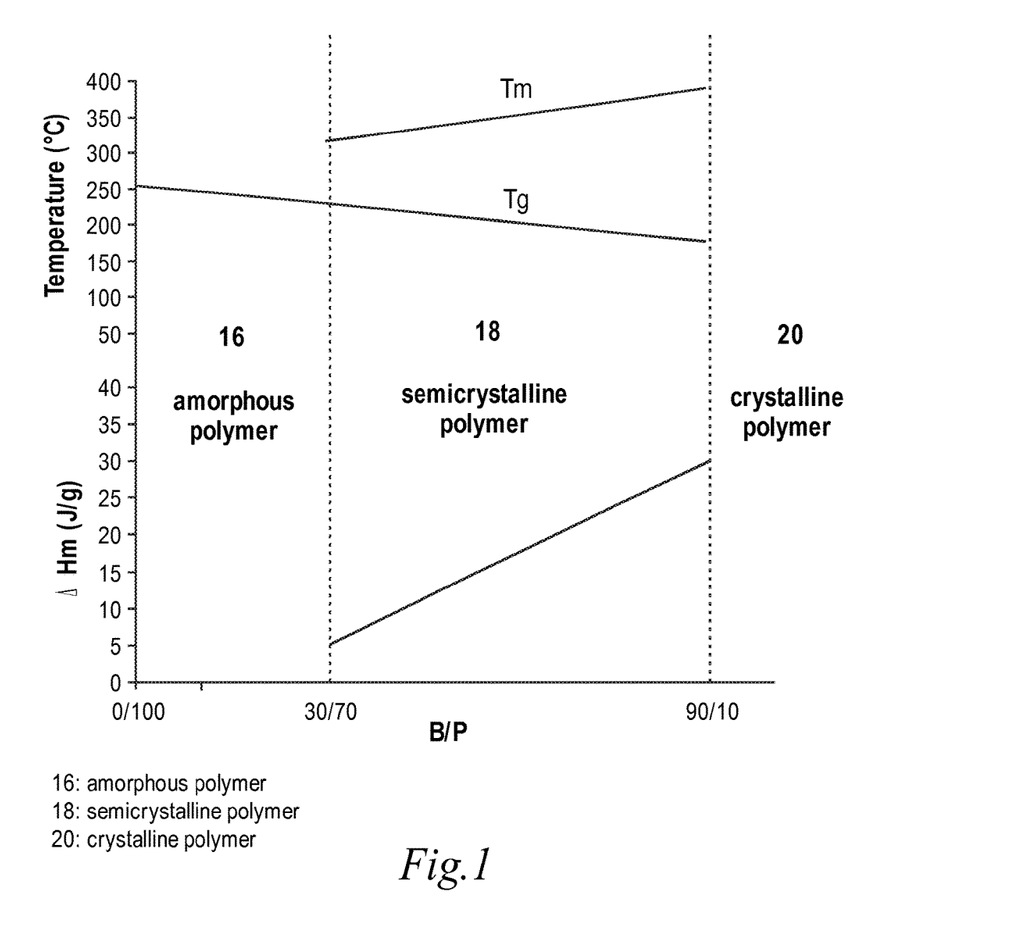
FIG. 1 is a stack graph describing the physical characteristics of the polymer family of the present teachings.

"Semicrystalline", as shown in FIG. 1, means a polymer of the present teachings with a B/P ratio between about 30/70 to 90/10, and with a $\Delta H_m$ of between about 5 and 26 J/g.

"UHTSP" means an Ultra High Temperature Semicrystalline Polymer, which is a melt processable polymer exhibiting, inter alia, the following characteristics: a high temperature performance, a high Tg over 180° C., a high Tm that is above 310° C. but less than 380° C., a continuous use temperature greater than or equal to 250° C., a heat deflection temperature (HDT) of 200° C. or higher, and insolubility in polar organic solvents and chlorinated solvents such as chloroform.

A. COMPOSITION AND PROPERTIES

In accordance with the present teachings, the inventors have discovered that the incorporation of 4,4'-biphenol as a comonomer unit into poly(aryl ether ketone)s containing a phthalazinone monomer, as described and disclosed herein, can unexpectedly result in a melt processable semicrystalline polymer with a Tg>180° C. that is not soluble in organic solvents such as chloroform. Even with the incorporation of 4,4'-biphenol as low as 30 mol %, the resulting poly(aryl ether ketone) is still semicrystalline with a Tg of 230° C., a melt temperature of 316° C., and a melting endotherm of 5.0 J/g. Given the relatively small amount of the 4,4'-biphenol comonomer incorporated, such a result is entirely unexpected.

Advantageously, this polymer is not soluble in chloroform, and compression molded film has good resistance to organic solvents.

In accordance with the present teachings, it has been discovered that semicrystalline poly(aryl ether ketone) with a high glass transition temperature (Tg) (>180° C.) can be prepared by polymerization of 4,4'-difluorobenzophenone with 4,4'-biphenol and 4-(4-hydroxyphenyl)phthalazin-1 (2H)-one (phthalazinone). These polymers can be processed via melt processes such as extrusion and injection molding.

The present teachings comprise, but are not limited to, the following:

Semicrystalline poly(aryl ether ketone) containing 4,4'-biphenol and a phthalazinone comonomer unit.

Semicrystalline poly(aryl ether ketone) containing a B/P ratio of between about 30/70 and about 90/10.

Semicrystalline poly(aryl ether ketone) having a Tg from about 185° C. to about 240° C.

Semicrystalline poly(aryl ether ketone) having high melting temperatures (Tm) from about 310° C. or above to about 380° C. or less.

Semicrystalline poly(aryl ether ketone) containing a phthalazinone comonomer unit that can be melt processed via common techniques such as extrusion or injection molding.

Pursuant to the present teachings, the Tg and melting temperature of crystalline poly(ether ketone)s containing phthalazinone comonomer units can be adjusted with varying levels of incorporation of 4,4'-biphenol monomer, and high Tg semicrystalline copolymers are thereby obtained. Examples are set forth below.

The glass transition temperature (Tg), melting temperature (Tm), and enthalpy of melting endotherm ($\Delta H_m$) of each polymer was measured by Differential Scanning calorimetry (DSC) using a TA Instruments Q-100 DSC machine with a heating rate of 20° C./minutes. The inherent viscosity of each polymer was measured at 30° C. on a solution of 0.5 g of polymer in 100 cm³ of solution in 98% sulfuric acid.

Incorporation of the biphenyl unit, by substituting 4,4'-biphenol for a portion of the phthalazinone in poly(aryl ether ketone) with a phthalazinone unit results in high molecular weight semicrystalline polymers with good ductility 12 (as defined in FIG. 2), which retain high melting temperatures, and which can be further prepared at reaction temperatures of about 360° C. or less. Due to the consistent limitations of the prior art and the molecular size and orientation of 4,4'-biphenol, the commercially desirable properties of the polymers described herein are neither anticipated nor expected.

The polymers of the present teachings have, for example, high melting temperatures of about 310° C. or above and 380° C. or less, glass transition temperatures of about 185° C. to 240° C., moderate to good crystallinity that is measured as enthalpy of melting endotherm of the polymers from about 5 J/g to about 26 J/g, as shown in FIG. 1, which can be synthesized with a high molecular weight that is measured as inherent viscosity (IV) of at least 0.7 or higher.

As shown in FIG. 1, which is a stack graph, the polymers of the present teachings 18 are semicrystalline, and comprise a B/P ratio of between about 30/70 through about 90/10, and a $\Delta H_m$ of between about 5 and about 26. Those polymers with a B/P ratio less than 30 percent B and/or a $\Delta H_m$ less than 5 are amorphous, and those polymers 20 with greater than 90 percent B (4,4'-biphenol) are crystalline.

Figure 2:
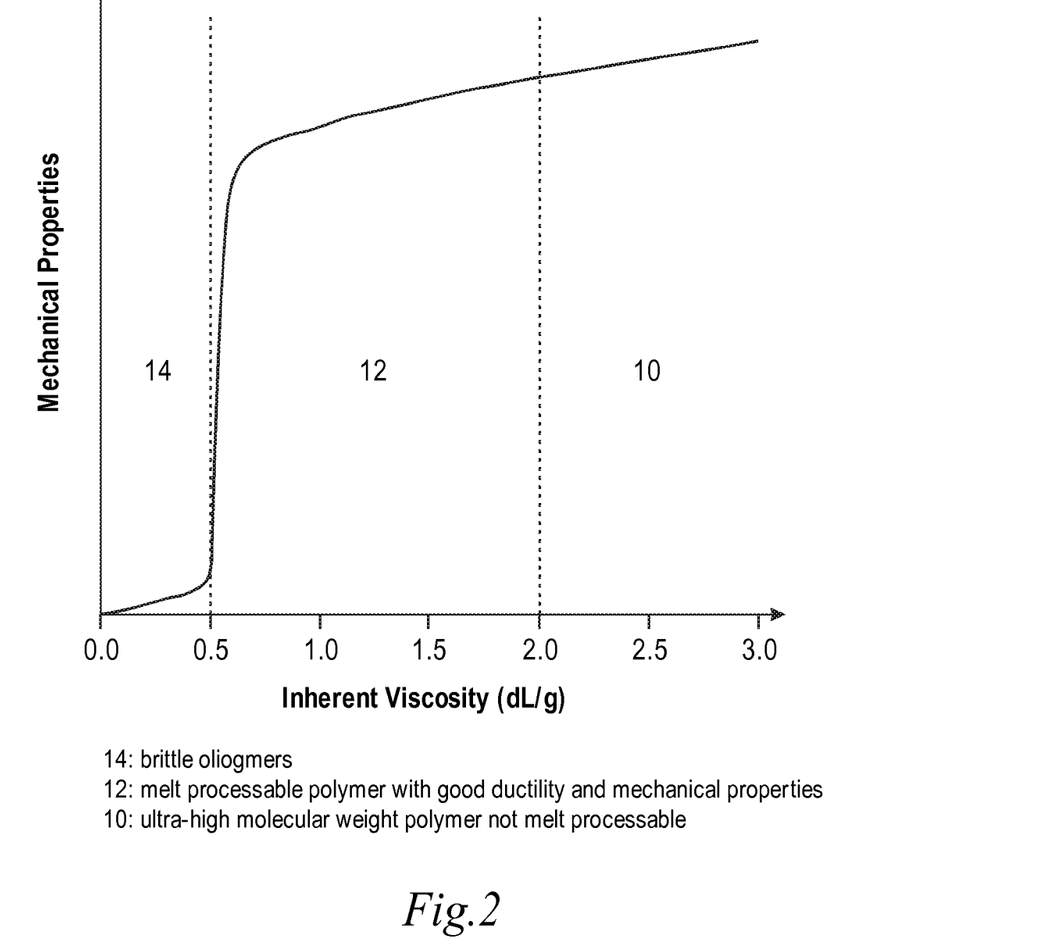
FIG. 2 is a graph showing the relationship of mechanical properties to inherent viscosity, and the properties exhibited by the polymers of the present teachings.

As shown in FIG. 2, polymers of the present teachings 12 have an inherent viscosity of between about 0.5 and about 2.0, and generally exhibit adequate mechanical properties; meaning, the polymers are ductile in nature, as opposed to brittle (lower molecular weight), or have decreased processability (higher molecular weight). Those polymers 14 with an inherent viscosity less than 0.5 are too brittle, and those polymers 10 with an inherent viscosity greater than 2.0, have decreased processability, and cannot be melt processed.

The novel poly(aryl ether ketone) of the present teachings can be characterized as containing the following arylether-ketone repeating units:

The starting monomers which are used to prepare the poly(aryl ether ketone)s of the present teachings comprise, for example, the following units: present teachings comprise, for example, the following units:

and and where X is fluorine or chlorine.

In various embodiments of the present teachings, the amount of biphenol to prepare the copolymers herein is such that the molar ratio (B/P) of co-monomer biphenol (B) to phthalazinone (P) is from about 30/70 to about 90/10. In some embodiments, the molar ratio is from about 35/65 to about 80/20. In some embodiments, the molar ratio is from about 40/60 to about 70/30, such that the resulting copolymer has a Tg greater than about 180° C., a Tm greater than about 310° C. and less than about 380° C., and a $\Delta H_m$ of at least about 5.0 J/g or higher.

In various embodiments of the present teachings, a melt processable polymer comprises an inherent viscosity (IV) of not more than about 2.0 dL/g. In some embodiments, the IV is not more than about 1.5. In some embodiments, the IV is not more than about 1.2. For ease of processing, the IV comprises a range of at least about 0.5 to about 1.1 dL/g. The lower range can be increased to at least 0.7 during processing.

Some examples of melt processable polymers according to the present teachings are characterized by one or more of the following properties: (1) being semicrystalline with a $\Delta H_m$ of at least about 5.0 J/g and in some embodiments about 15 J/g or higher, (2) being ductile when compression molded into a film, (3) being resistant to a wide range of organic solvents, and being "essentially unaffected" after immersion for 24 hours in chloroform at 25° C., without gaining more than about 10% by weight, and (4) having a Tg equal to or greater than about 180° C., and a Tm equal to or less than about 380° C. Because of their unique properties, the polymers of the present teachings are particularly useful for applications that require resistance to both high temperatures and to organic solvents.

The polymers according to the present teachings can be fabricated into any desired shape such as, for example, moldings, films, coatings or fibers. In particular, the polymers are useful for those applications which require a combination of good electrical insulating properties, good resistance to a wide range of chemicals, retention of mechanical properties at high temperatures, good resistance to burning with low emission of toxic fumes, and low smoke density on burning.

The polymers of the present teachings can also include and/or incorporate mineral fillers (e.g. mica, glass, quartz, clay) as well as various fibers (e.g. glass fibers, carbon fibers, polyarylamide fibers, ceramic fibers). The polymers can additionally comprise additives such as colorants, pigments, thermal stabilizers, and ultra violet stabilizers through means well known in the art.

The polymers of the present teachings can be melt blended with one or more other polymers which include but are not limited to polybenzimidazole, polyarylamide, polysulfones, polyketones, polyimides, polyetherimides, polyphenylene sulfides, fluoropolymers, polyesters and polycarbonates.

The technical approach to polymerization of the present teachings differs significantly from the art, including the '663 patent to Hay. In contrast to the art, the polymerization herein is carried out in a non-polar solvent, and the resulting polymers are semicrystalline. Moreover, the use of 4,4'-biphenol as a comonomer is not reported in the art. In addition, the present teachings disclose polymerization reactions conducted at significantly higher temperatures, generally between about 280° C. and about 320° C. In contrast, polymers containing a phthalazinone moiety currently reported in the art are processed at temperatures of 225° C. or less. These differences in polymerization methods and processes are novel.

B. PREPARATION

The polymers of the present teachings can be prepared in solution by heating the monomers with alkali metal carbonate or a mixture of alkali metal carbonates. The alkali metal carbonates are typically sodium carbonate, potassium carbonate or a mixture of sodium carbonate, potassium carbonate and cesium carbonate.

The alkali metal carbonates can be anhydrous, if hydrated salts are employed, where the polymerization temperature is less than about 250° C. Water can be removed, e.g. by heating under reduced pressure or dehydration via azeotropic distillation with organic solvent such as toluene or o-dichlorobenzene, prior to reaching the polymerization temperature.

Where the polymerization temperature is greater than 250° C., such as 270° C., it is not necessary to dehydrate the carbonate first, as any water is driven off rapidly before it can adversely affect the polymerization reaction.

The total amount of alkali metal carbonate used can be such that there is at least 1 atom of alkali metal for each phenol OH or phthalazinone NH group. An excess of alkali metal carbonate can be employed, and there may be 1 to 1.2 atoms of alkali metal per phenol OH or phthalazinone NH group.

In various embodiments of the present teachings, the polymerization is carried out in an inert solvent such as diphenyl sulfone and benzophenone. In some embodiments, the polymerization is carried out at temperatures from about 200° C. to about 400° C. In some embodiments, the polymerization temperature is above about 260° C. The reactions are generally performed under atmospheric pressure; however, the reactions can also be performed at higher or lower pressures.

For preparation of some polymers, it may be desirable to commence polymerization at one temperature, e.g. between about 180° C. and about 250° C., and then increase the temperature as polymerization ensues. This is particularly advantageous when fabricating polymers having only a low solubility in the solvent. Thus, it is desirable to increase the temperature progressively to maintain the polymer in solution as its molecular weight increases. In some embodiments, the process comprises an elevated temperature of about 180° C. to about 360° C. In other embodiments, the process comprises an elevated temperature of about 220° C. to about 340° C. In order to minimize degradation reactions in some embodiments, the maximum polymerization temperature can be below 360° C.

The following examples are illustrative of the practice of the present teachings and are not intended in any way to limit their scope.

C. EXAMPLES

Preparation of Poly(aryl ether ketone) from 4,4'-Biphenol and Phthalazinone Monomer.

Example 1—Copolymer with Molar Ratio of 4,4'-Biphenol and Phthalazinone B/P=30/70

To a 250 mL three-neck round-bottomed flask, equipped with a nitrogen inlet, thermocouple, mechanical stirrer, Dean-Stark trap and condenser, 21.82 grams (100.0 mmol) of dried 4,4'-difluorobenzophenone, 16.76 grams (70.0 mmol) of dried phthalazinone monomer, 5.59 grams (30.0 mmol) of dried 4,4'-biphenol and 14.65 grams (106.0 mmol) of anhydrous potassium carbonate were charged. Diphenyl sulfone (132.5 grams) and chlorobenzene (30.0 ml) were then added. The reaction medium was heated to 170° C., and chlorobenzene was distilled to remove water over one hour. The reaction mixture was then heated to 200° C. and maintained for two hrs. The reaction mixture was further heated to 300° C. and maintained for four hrs. The reaction was terminated, and the mixture was cast into sheet on a glass surface in a glass tray and cooled to room temperature. The cooled solid was then hammer milled to fine particles less than about 60 mesh.

The fine particles were placed into a flask with 500 ml acetone, heated under reflux for one hour, and then filtered. This process was repeated five times to remove diphenylsulfone. The resulting powder material was then placed into a flask with 500 ml deionized water, heated under reflux for one hour, and then filtered. This process was repeated five times to remove inorganic salts.

The resulting solid polymer was then dried at 120° C. under vacuum overnight. The white polymer has an inherent viscosity (IV) of about 0.78 dL/g (0.5 g/dL solution of the polymer in 98% sulfuric acid at 30° C.), a glass transition temperature of about 230° C., a melting temperature of about 316° C. and a melting endotherm of about 5.0 J/g. The polymer is insoluble in chloroform, dimethylformamide (DMF) and N-cyclohexylpyrrolidinone (CHP).

The powdered polymer was compression molded at 375° C. for five minutes to give a tough opaque film. A sample of film immersed in chloroform at 25° C. for 24 hours showed a weight increase of 1.8%. The film remained resistant with no visible effects of attack by chloroform.

Example 2—Copolymer with Molar Ratio of 4,4'-Biphenol and Phthalazinone B/P=40/60

A copolymer with a 40/60 molar ratio of 4,4'-biphenol and phthalazinone monomer was prepared according to the procedure described in Example 1. The resulting polymer has an inherent viscosity (IV) of about 0.74 dL/g, a glass transition temperature of about 225° C., a melting temperature of about 336° C. and a melting endotherm of about 8.0 J/g. The polymer is insoluble in chloroform, dimethylformamide (DMF) and N-cyclohexylpyrrolidinone (CHP).

Example 3—Copolymer with Molar Ratio of 4,4'-Biphenol and Phthalazinone B/P=60/40

A copolymer with a 60/40 molar ratio of 4,4'-biphenol and phthalazinone monomer was prepared according to the procedure described in Example 1. The resulting polymer has an inherent viscosity (IV) of about 0.79 dL/g, a glass transition temperature of about 204° C., melting temperature of about 357° C. and a melting endotherm of about 16.0 J/g. The polymer is insoluble in chloroform, dimethylformamide (DMF) and N-cyclohexylpyrrolidinone (CHP).

Example 4—Copolymer with Molar Ratio of 4,4'-Biphenol and Phthalazinone B/P=65/35

A copolymer with a 65/35 molar ratio of 4,4'-biphenol and phthalazinone monomer was prepared according to the procedure described in Example 1. The resulting polymer has an inherent viscosity (IV) of about 1.48 dL/g, a glass transition temperature of about 205° C., a melting temperature of about 347° C. and a melting endotherm of about 14.0 J/g. The polymer is insoluble in chloroform, dimethylformamide (DMF) and N-cyclohexylpyrrolidinone (CHP).

Example 5—Copolymer with Molar Ratio of 4,4'-Biphenol and Phthalazinone B/P=70/30

A copolymer with a 70/30 molar ratio of 4,4'-biphenol and phthalazinone monomer was prepared according to the procedure described in Example 1. The resulting polymer has an inherent viscosity (IV) of about 0.75 dL/g, a glass transition temperature of about 200° C., a melting temperature of about 368° C. and a melting endotherm of about 25.0 J/g. The polymer is insoluble in chloroform, dimethylformamide (DMF) and N-cyclohexylpyrrolidinone (CHP).

Example 6—Copolymer with Molar Ratio of 4,4'-Biphenol and Phthalazinone B/P=75/25

A copolymer with a 75/25 molar ratio of 4,4'-biphenol and phthalazinone monomer was prepared according to the procedure described in Example 1. The resulting polymer has an inherent viscosity (IV) of about 0.73 dL/g, a glass transition temperature of about 190° C., a melting temperature of about 376° C. and a melting endotherm of about 26.0 J/g. The polymer is insoluble in chloroform, dimethylformamide (DMF) and N-cyclohexylpyrrolidinone (CHP).

Example 7—Copolymer with Molar Ratio of 4,4'-Biphenol and Phthalazinone B/P=80/20

A copolymer with an 80/20 molar ratio of 4,4'-biphenol and phthalazinone monomer was prepared according to the procedure described in Example 1. The resulting polymer has an inherent viscosity (IV) of about 0.95 dL/g, a glass transition temperature of about 185° C., a melting temperature of about 367° C. and a melting endotherm of about 24.0 J/g. The polymer is insoluble in chloroform, dimethylformamide (DMF) and N-cyclohexylpyrrolidinone (CHP).

Comparative Example A—Amorphous Copolymer with Molar Ratio of 4,4'-Biphenol and Phthalazinone B/P=20/80

A copolymer with a 20/80 molar ratio of 4,4'-biphenol and phthalazinone monomer was prepared according to the procedure described in Example 1. The resulting amorphous polymer has an inherent viscosity (IV) of about 1.02 dL/g (0.5 g/dL solution of polymer in chloroform at 25° C.) and a glass transition temperature of about 240° C. The polymer is soluble in chloroform, dimethylformamide (DMF) and N-cyclohexylpyrrolidinone (CHP) at room temperature.

Comparative Example B—Amorphous Copolymer with Molar Ratio of 4,4'-Biphenol and Phthalazinone B/P=25/75

A copolymer with a 25/75 molar ratio of 4,4'-biphenol and phthalazinone monomer was prepared according to the procedure described in Example 1. The resulting amorphous polymer has an inherent viscosity (IV) of about 0.78 dL/g (0.5 g/dL solution of the polymer in 98% sulfuric acid at 30° C.), and a glass transition temperature of about 232° C. The polymer is insoluble in chloroform, dimethylformamide (DMF) and N-cyclohexylpyrrolidinone (CHP) at room temperature.

Comparative Example C—Low Molecular Weight Copolymer with Molar Ratio of 4,4'-Biphenol and Phthalazinone B/P=70/30 Using N-cyclohexylpyrrolidinone (CHP) as Polymerization Solvent

To a 100 mL three-neck round-bottomed flask, equipped with a nitrogen inlet, thermal couple, mechanical stirrer, Dean-Stark trap and condenser, 8.77 grams (40.0 mmol) of dried 4,4'-difluorobenzophenone, 2.87 grams (12.0 mmol) of dried phthalazinone monomer, 5.24 grams (28.0 mmol) of dried 4,4'-biphenol and 5.88 grams (42.4 mmol) of anhydrous potassium carbonate were charged. N-cyclohexylpyrrolidinone (CHP) (31.1 ml) and chlorobenzene (19.0 ml) were then added. The reaction medium was heated to 170° C., and chlorobenzene was distilled to remove water over one hour. The reaction mixture was then heated to 230° C. and maintained for four hours. At the end of the reaction, the mixture was poured into 200 ml of a mixture of methanol and water (ratio of 1:4). After filtration, the polymer powder was washed with methanol three times to remove any residual CHP. The resulting polymer powder was then placed into a 250 ml flask with 150 ml de-ionized water. The mixture was heated to reflux for three hours to remove any remaining potassium salt. After filtration, the white polymer powder was dried at 120° C. under vacuum over 24 hrs. The resulting polymer has an inherent viscosity (IV) of about 0.23 dL/g (0.5 g/dL solution of the polymer in 98% sulfuric acid at 30° C.), a glass transition temperature of about 185° C., a melting temperature of about 340° C. and a melting endotherm of about 37.0 J/g. The polymer is insoluble in chloroform, dimethylformamide (DMF) and N-cyclohexylpyrrolidinone (CHP). The powdered polymer was compression molded at 375° C. between two metal sheets for five minutes to obtain a brittle opaque film. The film was so brittle that it broke into small pieces when it was demolded from the metal sheet.

In one embodiment, an article of manufacture may advantageously be a high temperature resistant molded system, comprising a polymer composition, comprising a polymer according to formula (I):

(I)

wherein Cp is a phthalazinone unit of formula (II);

Q is a biphenol unit of formula (III);

Z is an aromatic ketone unit of formula (IV) or (V);

b is a value of 0 through 1 x is a value of at least 1; and
y is a value of at least 1.

As many high temperature polymers, this high temperature poly(aryl ether ketone) play an important role is many energy related application including exploration, transportation, storage and generation. It can be adopted in many existing applications with additional thermal and mechanical characteristics. In addition, this high temperature poly(aryl ether ketone) have a unique combination of high glass transition temperatures above conventional semi-crystalline poly(aryl ether ketone)s and with enhanced chemical and environmental resistance over conventional amorphous high temperature polymers such as PBI, PES, PPSU and other thermal plastic polyimides.

Following are some examples for the usage and high temperature resistant article of manufacture. Examples of these unique high temperature poly(aryl ether ketone) are provided here.

1.1 Oil and Gas Exploration and Production Related Applications

Conventional high temperature polymers play critical role in many energy related applications. The key characteristics required include high mechanical strength to withstand high pressure and loads; high continuous operating temperature; resistant to chemical attack—provides corrosion resistance; wear and creep resistant; dimensionally stable over operating range.

Examples of these applications include many components used in oil and gas industries such as:

a. Compressor components used in reciprocating compressors such as suction & discharge valves, valve plates, valve rings, and poppets; piston rings and rider rings; rod packing/pressure packing. Used in turbo compressors such as labyrinth seals and shaft seals. Used in linear compressors such as discharge valves.

b. Bushing, bearings, thrust washers, seal and rings including ball valve seats, energized seal, pump packing and back-up rings used in well completion.

c. High voltage connectors used for power and data transfer.

d. Corrosion protection such as coating and extruded pipe liners.

e. Instrument housing and other structural or non-structural components.

1.2 Energy Storage

This high temperature poly(aryl ether ketone) polymer displayed excellent stability of the dielectric properties over a broad frequency and temperature range, typically with little dielectric loss up to Tg. Little change in breakdown field and discharge time has been observed in this high temperature poly(aryl ether ketone) polymer up to 190° C. Superior energy densities, remarkable breakdown strengths, and fast discharge speeds have been demonstrated at various temperatures, indicating the potential of this high temperature poly(aryl ether ketone) polymer for elevated-temperature energy storage applications. It is possible to create the next generation film capacitors economically.

1.2.1 Fuel Cell

The efficiency of proton exchange improved when fuel cell membrane can be operated at temperature above 110° C. Extensive work has been done to development high temperature fuel cell membranes using PBI, PEKEKK or PEKK. Suitable material is typically functionalized to allow proton exchange and it's important for the membrane to remain stable in highly oxidative conditions at elevated temperatures. This high temperature poly(aryl ether ketone) polymer provides a wide range of possibility as membrane material while this poly(aryl ether ketone) alloy with PBI may improve the processability and other process and mechanical advantage over existing material alternatives.

1.3 High Temperature Corrosion Protection Coating and Lining

This high temperature poly(aryl ether ketone) polymer has been shown to improve adhesion to common metallic substrates, especially in concaved surfaces such as container and pipe internal diameters and corners. This allows adoption of a thermally stable, wear resistance protective coating and lining for corrosion resistance. In addition to coating on valves, joints, elbows, pipe section and other components used in energy industry, this high temperature poly(aryl ether ketone) polymer coating can also be adopted in areas such as plasma chamber used in wafer production, cookware, and similar components used in chemical industries.

1.4 Connectors

Connectors used in oil & gas industry are often used in high pressure and temperature over 180° C. Common connector failures include cracking under load and pin extrusion mainly due to combination of lower Tg and brittleness of existing material such as PEK. This high temperature poly(aryl ether ketone) polymer provide enhanced Tg above 180° C. while retain insulative and chemical resistance properties with crystallization behavior that can be tailor to match the processing requirements.

1.5 Advanced Materials and Composites Made With This High Temperature Poly(aryl ether ketone) Polymer 1.5.1 Composite & Prepreg With a combination of high Tg, wide range of Tm, and tailored rate of crystallization, this high temperature poly (aryl ether ketone) polymer is excellent choice for the next generation prepreg material with common reinforcement fibers such as glass and carbon fibers.

Unlike other compatible polymer blends or compounds, this high temperature poly(aryl ether ketone) polymer can be applied with conventional prepregging process without phase separation and with good adhesion to reinforcing materials. The prepreg can then be further processed with conventional composition processing techniques into sheet and other articles for industrial applications.

1.5.2 Films, Tapes and Laminates

With high Tg and relatively low processing temperatures, this high temperature poly(aryl ether ketone) polymers provide good alternatives to traditional tape wrapping materials such as thermoset polyimide, fluoropolymer or PEEK tapes. Comparing to other high temperature tape wrapping materials such as thermoset polyimides, this high temperature poly(aryl ether ketone) polymer can be welded by heat, friction or ultrasonically for many high temperature wire and cable applications currently limited by the adhesive layers used in tape.

This high temperature poly(aryl ether ketone) polymer can be manufactured into film and tapes with common adhesives. Because of the wide availability of second miscible components, the basic film properties can be tailored to match up with desired adhesives or for further lamination.

This high temperature poly(aryl ether ketone) polymer can be used as high temperature flexible and rigid circuit board material with its characteristics to be easily laminated with other substrate or reinforcing fiber and fabric.

1.5.3 Fibers and Fabric

Conventional melt spinning process can be used for this high temperature poly(aryl ether ketone) polymer to produce high temperature fibers. They can then be used as brushes, pin and hook self-release tapes, weaved sleeve for cable protection or fabrics for many industrial applications.

1.5.4 Molded and Extruded Articles of This High Temperature Poly(aryl ether ketone) Polymer The most common applications of this high temperature poly(aryl ether ketone) polymer are direct molded components and parts to be used as many metal and ceramic replacements in high wear, high temperature and/or corrosive environments. They are used for fluid handling components such as fitting, valves, pump housing, they can also be extruded into tubing, pipes, and connectors used in liquid transfer applications. Additionally, they can be extruded into rods, sheet and tubes to be used as feedstock for machining similar to metal and ceramic stock shapes used in industry.

1.6 Electrical & Electronic Applications

Similar to other poly(aryl ether ketone)s, this high temperature poly(aryl ether ketone) polymer can be used in a wide variety of electric and electronic applications. Comparing to traditional electric components using polyimides, this high temperature poly(aryl ether ketone) polymer provides superior environmental resistance similar to existing polyketones but with additional temperature capability that is normally seen with thermoset polyimide or other high Tg amorphous polysulfone or polyimide family of polymers. They can be used as connectors, flow meter housing, switch gear in many hostile environments such as nuclear power plants and downhole oil and gas applications.

This high temperature poly(aryl ether ketone) polymer can also be used in many traditional electronics, opto-electronic application such as semi-conductor, LCD and LED production where high temperature mechanical strength, purity, environmental resistance and ability to withstand plasma and radiation are required.

1.7 Transportation

This high temperature poly(aryl ether ketone) polymer can be used as structural and non-structural components in transportation such as automobile, aircraft, and rail applications. Comparing to PPSU that is widely used as interior components and PEEK used in under-hood automobile engine and transmission parts, this high temperature poly (aryl ether ketone) polymer offer additional high temperature strength and can be used as neat resin, compounds or composites.

In the automotive industry, aromatic polyketones are used in engine and transmission parts that require: (1) high mechanical strength; (2) temperature resistance from −40° C. to +180° C.; (3) good wear properties; (4) automotive fluids resistance; (5) corrosion resistance; (6) tight tolerances.

Examples of applications are:

Engine: Oil pump, Mass Balance Gear, Cam Shaft Bearing, Washer, Turbocharger Impeller Transmission: Seal ring, Thrust Washer, Check Ball, Fork Pad Steering/Suspension: EPS Gear, Steering Column Adjust, Ball Joints, Column Sleeve Seat Adjustment: Worm Gear Damper/Clutch: Friction Ring, Washer Lighting: Lamp Socket Fuel Management: Bushing, Pump Shoe, Fuel Liner, Quick Connect Electronic/Sensor: Wiring, O2 Sensor HVAC: Compressor Seal, Gears Mode Door Door Modules: Door Hinge, Roller, Gears Small Motor: Thrust Plug, Washer Vacuum Pumps: Tip, Vane, Rotor Brakes: Tappet, Piston, Plunger

1.8 Medical & Food Industrial Applications

Conventional high temperature materials, such as PPSU, PEKK and PEEK, were widely adopted in food contact containers and trays, medical implantable and non-implantable devices, and many medical instrument components. This high temperature poly(aryl ether ketone) polymer retain the same biocompatibility, can be heat, irradiation and chemically sterilized, while offer additional design flexibility and process versatility.

This high temperature poly(aryl ether ketone) polymer composite will also offer additional improvement with repeat sterilization at high temperatures that is suitable of surgical tools and orthopedic and other implantable devices for stabilization, fixation and wear applications.

In an embodiment, the article of manufacture may be made by a process selected from the group consisting of extrusion, injection molding, centrifuge molding, blow molding, rotational molding, transfer molding, thermoforming and compression molding.

In an embodiment of the article of manufacture, in the polymer composition, Z may be an aromatic ketone unit of formula (VI)

In an embodiment of the article of manufacture, the polymer composition may advantageously be a melt processable semicrystalline aromatic polymer composition.

In an embodiment of the article of manufacture, in the polymer composition, x and y may advantageously be such that the molar ratio of Q to Cp is between about 30/70 and 90/10.

In an embodiment of the article of manufacture, in the polymer composition, x+y=n, where n is a value such that the polymer has an inherent viscosity of at least about 0.5 dL/g.

In an embodiment of the article of manufacture, the polymer composition further comprises a filler.

In an embodiment, the article of manufacture, wherein the polymer composition further comprises a filler, may advantageously be made by a process such as extrusion, injection molding, centrifuge molding, blow molding, rotational molding, transfer molding, thermoforming, and compression molding. In this embodiment, in the polymer composition said filler is selected from the group consisting of mica, glass, quartz, clay, glass fibers, carbon fibers, polyarylamide fibers, and ceramic fibers.

In this embodiment, in the polymer composition further comprising a filler, Z may be an aromatic ketone unit of formula (VI)

In an embodiment, in the polymer composition further comprising a filler, x and y are such that the molar ratio of Q to Cp is between about 30/70 and 90/10.

In an embodiment, in the polymer composition further comprising a filler, x+y=n, where n is a value such that the polymer has an inherent viscosity of at least about 0.5 dL/g.

In an embodiment, in the polymer composition further comprising a filler, said filler is selected from the group consisting of mica, glass, quartz, clay, glass fibers, carbon fibers, polyarylamide fibers, and ceramic fibers.

In one embodiment, the polymer composition advantageously further comprises a second polymer selected from the group consisting of polybenzimidazole, polyarylamide, poly-sulfones, polyketones, polyimides, polyetherimides, polyphenylene sulfides, fluoropolymers, polyesters and polycarbonates.

In an embodiment, in the polymer composition further comprising a second polymer, the polyketone may be a polymer selected from the group consisting of poly(aryl ether ketone), poly(ether ether ketone), poly(ether ketone ketone), poly(ether ketone), and poly(ether ketone ether ketone ketone).

Alternatively, in another embodiment, in the polymer composition further comprising a second polymer, the second polymer is advantageously polybenzimidazole.

Alternatively, in another embodiment, in the polymer composition further comprising a second polymer, the poly-sulfone polymer may be a polymer selected from the group consisting of poly(ether sulfone) and poly(aryl ether sulfone).

In one embodiment, in the polymer composition comprising the second polymer, the polymer composition of the high temperature resistant molded system article of manufacture further comprises a filler. In this embodiment, the filler may be mica, glass, quartz, clay, glass fibers, carbon fibers, polyarylamide fibers, and ceramic fibers.

In one embodiment, the article of manufacture, wherein the polymer composition further comprises a second polymer and a filler, may advantageously be made by a process selected from the group consisting of extrusion, injection molding, centrifuge molding, blow molding, rotational molding, transfer molding, thermoforming and compression molding.

In one embodiment, the second polymer in the polymer composition comprising a second polymer and a filler is selected from the group consisting of polybenzimidazole, polyarylamide, poly-sulfones, polyketones, polyimides, polyetherimides, polyphenylene sulfides, fluoropolymers, polyesters and polycarbonates.

Alternatively, in an embodiment, in the polymer composition comprising a second polymer and a filler, the polyketone may be a polymer selected from the group consisting of poly(aryl ether ketone), poly(ether ether ketone), poly(ether ketone ketone), poly(ether ketone), and poly(ether ketone ether ketone ketone).

Alternatively, in an embodiment, in the polymer composition comprising a second polymer and a filler, the second polymer is polybenzimidazole.

In an embodiment, in the polymer composition comprising a second polymer and a filler, the poly-sulfone polymer may be selected from the group consisting of poly(ether sulfone) and poly(aryl ether sulfone).

In an embodiment, in the polymer composition comprising a second polymer and a filler, the filler is selected from the group consisting of mica, glass, quartz, clay, glass fibers, carbon fibers, polyarylamide fibers, and ceramic fibers.

The section headings used herein are for organizational purposes only and are not to be construed as limiting the subject matter described in any way.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

What is claimed is:

1. An article of manufacture, comprising a polymer composition, said polymer composition comprising a melt processable, semicrystalline aromatic polyetherketone polymer according to formula (I):

wherein Cp is a phthalazinone unit of formula (II);

Q is a biphenol unit of formula (III);

Z is an aromatic ketone unit of formula (VI);

wherein x is a value of at least 1,
wherein y is a value of at least 1,
wherein x and y are such that the molar ratio of Q to Cp is between about 30/70 and 90/10, and
wherein the melt processable semicrystalline aromatic polyetherketone polymer has an enthalpy of melting endotherm of between about 5.0 J/g and 26.0 J/g.

2. The article according to claim 1, wherein x+y=n, and n is a value such that the polymer has an inherent viscosity of at least about 0.5 dL/g.

3. The article according to claim 1, wherein the article is a high temperature resistant molded system.

4. The article according to claim 3, wherein the article of manufacture is selected from the group consisting of suction and discharge valves, valve plates, valve rings, poppets, piston rings and rider rings, and rod packing/pressure packing, bushings, bearings, thrust washers, seal and rings, ball valve seats, energized seals, pump packings and back-up rings, high voltage connectors, coated pipe liners, and housings for instruments, fuel cell membranes, valves, joints, elbows, pipe section, coated plasma chambers, cookware, prepregs, high temperature fibers, molded articles, extruded articles, semi-conductor substrates, LCD substrates, LED substrates, oil pump, mass balance gears, cam shaft bearings, washers, turbocharger impellers, seal rings, thrust washers, check balls, fork pads, EPS Gears, steering column adjusts, ball joints, column sleeves, worm gears, friction rings, washers, lamp sockets, bushings, pump shoes, fuel liners, quick connect wiring, $O_2$ sensors, compressor seals, gears mode doors, door hinges, rollers, thrust plugs, washers, tips, vanes, rotors, tappets, pistons, plungers, food contact containers, trays, medical implantable devices, surgical tools, and medical instrument components.

5. A process for making the article of manufacture of claim 1, comprising:
providing the polymer composition of claim 1; and
forming the article by a process is-selected from the group consisting of extrusion, injection molding, centrifuge molding, blow molding, rotational molding, transfer molding, thermoforming, and compression molding.

6. The process of claim 5, comprising: adding filler, wherein said filler is selected from the group consisting of mica, glass, quartz, clay, glass fibers, carbon fibers, polyarylamide fibers, and ceramic fibers.

7. The article of manufacture of claim 1, wherein x+y=n, and n is a value such that the polymer has a glass transition temperature between about 180° C. and 240° C.

* * * * *